W. D. ROBERTSHAW.
DEVICE FOR KILLING BOLL WEEVILS.
APPLICATION FILED OCT. 8, 1914.

1,159,097.

Patented Nov. 2, 1915.
2 SHEETS—SHEET 1.

WITNESSES
Samuel E. Wade.
William E. Beck.

INVENTOR
William D. Robertshaw
BY Munn & Co.
ATTORNEYS

W. D. ROBERTSHAW.
DEVICE FOR KILLING BOLL WEEVILS.
APPLICATION FILED OCT. 8, 1914.
1,159,097.
Patented Nov. 2, 1915.
2 SHEETS—SHEET 2.
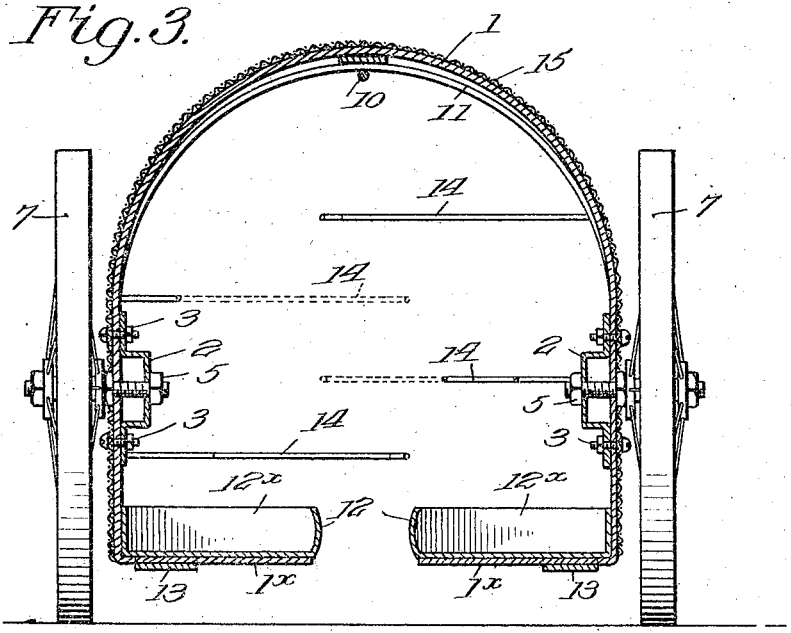
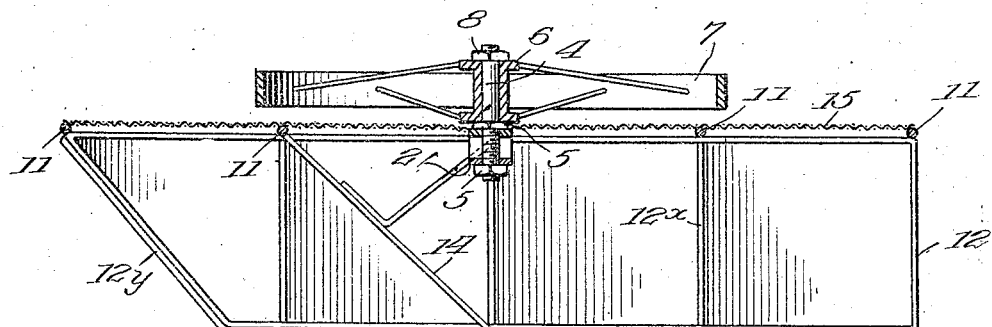
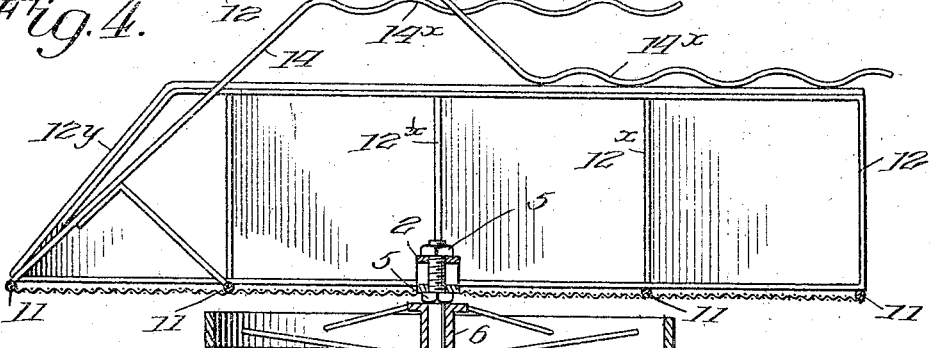
WITNESSES
Samuel E. Wade.
William E. Beck.
INVENTOR
William D. Robertshaw
BY Munn & Co.
ATTORNEYS

UNITED STATES PATENT OFFICE.

WILLIAM DANIEL ROBERTSHAW, OF GREENVILLE, MISSISSIPPI.

DEVICE FOR KILLING BOLL-WEEVILS.

1,159,097.

Specification of Letters Patent.

Patented Nov. 2, 1915.

Application filed October 8, 1914. Serial No. 865,751.

*To all whom it may concern:*

Be it known that I, WILLIAM D. ROBERTSHAW, a citizen of the United States, and a resident of Greenville, county of Washington, and State of Mississippi, have made certain new and useful Improvements in Devices for Killing Boll-Weevils, of which the following is a specification.

My invention relates to improvements in devices for killing cotton boll weevils, and it consists in the combinations, constructions and arrangements herein described and claimed.

An object of my invention is to provide a device which may be drawn along the rows of cotton and which during its movement will knock the insects from the plants without injuring the latter.

A further object of my invention is to provide a device of the type described having pans or receptacles which may be filled with oil into which the boll weevils are projected, thereby insuring the death of the insects and at the same time collecting them.

A further object of my invention is to provide a device of the type described in which springs are so disposed as to most effectively agitate the growing plant so as to insure the shaking of the insects from the plant and their projection into the receptacles.

A further object of my invention is to provide a device of the type described which will effectively gather and kill the boll weevils without working any injury to the plant.

Other objects and advantages will appear in the following specification and the novel features of the invention will be particularly pointed out in the appended claims.

Figure 1:
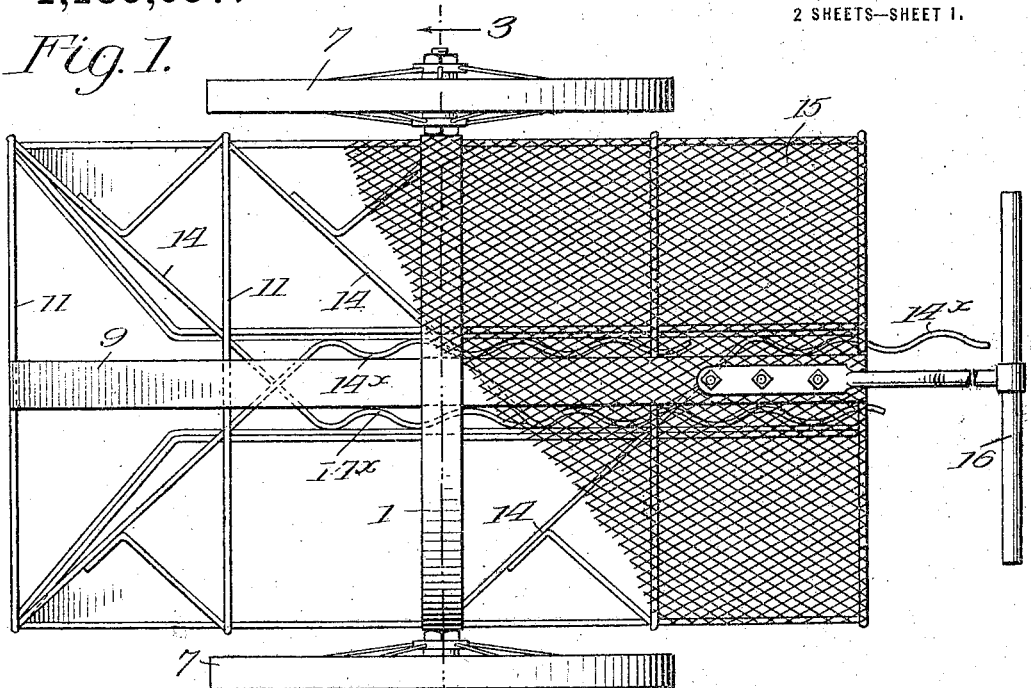
Figure 2:
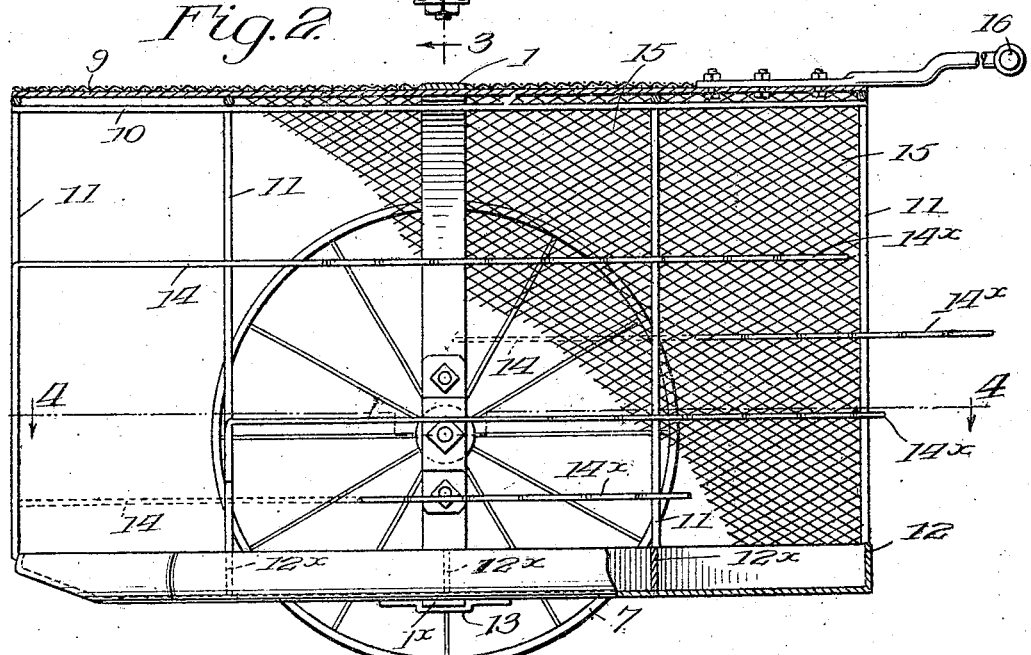

My invention is illustrated in the accompanying drawing forming a part of this application in which similar reference characters indicate like parts in the several views, and in which, Figure 1 is a plan view of the device, certain portions being omitted for the sake of cleanness, Fig. 2 is a central longitudinal section through the device, Fig. 3 is a section along the line 3—3 of Fig. 1, looking in the direction of the arrows, and Fig. 4 is a section along the line 4—4 of Fig. 2 looking in the direction of the arrows.

In carrying out my invention I provide a main transverse bow 1 which may be made of metal or other suitable material. On the inner side of the bow 1 toward the bottom thereof I provide U-shaped brackets 2 which are secured to the bow by means of bolts 3 or in any other suitable manner. The bow 1 and the brackets 2 are provided with registering openings for the reception of the axle bolts 4, these bolts being secured in position by means of the nuts 5. The outer end of the axle bolt as will be seen from Fig. 4 forms the journal for the hub 6 of the wheel 7, the wheel being secured in position by means of a nut 8. As will be seen from Fig. 4 two wheels are provided and the construction of each wheel is precisely similar to that of the other one.

Secured to the main bow 1 at the central upper portion thereof is a longitudinal bar 9 between which and a lower longitudinal rod 10 are secured the central portions of the auxiliary bows 11 which are spaced apart from one another, as clearly shown in the drawings.

As will be seen from Fig. 3 the bottom portions of the bow 1 are bent inwardly, as shown at $1^x$, in order to form supports for the receptacles 12. The portions $1^x$ may be soldered to the bottom of the receptacles or otherwise secured and preferably pass through U-shaped brackets 13 on the bottom of the pans. The ends of the bows 11 are secured to the upper edges of the pans so that the two pans 12 are suspended at their outer edges and project toward one another, their inner edges being spaced apart to provide a passage for the stems of the plants.

As will be seen from Fig. 4 the forward edges of the pans 12 are inclined outwardly, as shown at $12^y$, and these edges, as well as the inner edges of the pans are curved so as not to present any sharp edges to the stems of the plant. The pans 12 are divided into compartments by means of a series of transverse partitions $12^x$. Secured to the auxiliary bows 11 are a number of springs 14. These springs are inclined rearwardly and extend toward the center. The end of each spring is bent rearwardly and is fluted, as shown at $14^x$, for a purpose hereinafter described. Moreover, the springs are in staggered relation both horizontally and vertically. Over the outside of the frame, formed by the bows, is a covering of fine wire netting 15 or canvas. A handle 16 may be secured to the longitudinal member 9 at the rear of the device in order to propel the same.

From the foregoing description of the various parts of the device the operation thereof may readily be understood.

The compartments formed by the partitions 12 may be filled with oil or other suitable liquid which is fatal to boll weevils. The device is propelled along the rows in such a manner that the stems or stalks of the plant pass into the opening formed by the diverging ends 12ʸ, and from thence into the space between the opposed pans. The frame formed by the bows is designed to be large enough to permit the plants to enter underneath the bows. As the springs 14 come in contact with the various portions of the plant they are forced aside and owing to the fluted form of their ends there is a vibratory motion given the springs which causes the violent agitation of the plant, thereby knocking off the insects. These fall into the pans or receptacles which contain the oil and the majority are killed by the oil. Owing to the resiliency of the springs the device is easily propelled over a row of cotton plants and the action of the springs in knocking off the boll weevils is continuous, since as stated above the springs are in staggered relation. The result is that the plants are freed from the insects.

The device has the added advantage that it collects the insects which are knocked off of the plant. The oil may be ignited without removing it from the receptacles, and thus the insects may be totally destroyed, or the oil containing the insects may be poured out into any suitable receptacle and ignited.

I claim:

1. In a device for killing boll weevils, a frame comprising a plurality of bows spaced apart, said bows being secured together, a pair of open receptacles carried by said bows at their lower ends, said receptacles being spaced apart to provide a passage for the stems of the plants, and means carried by the bows and arranged to engage the plants during the movement of the frame for agitating the plants and thereby projecting the boll weevil into the receptacles, said last-named means comprising a plurality of inwardly projecting spring members, said spring members being carried by said bows and being inclined rearwardly, the rear ends of said spring members being fluted.

2. In a device for killing boll weevils, a frame comprising a main central bow, wheels carried thereby, a plurality of auxiliary bows spaced from said main central bow and secured to the latter, a pair of open receptacles supported by said bows at the bottom ends thereof, said receptacles being spaced apart to provide a passage for the stems of the plant and the front ends of the receptacles flaring outwardly to provide guide means for the stems of the plants, a series of inwardly extending inclined spring arms secured to said bows, said arms being in staggered relation to each other, and the rear ends of said arms being fluted.

3. In a device for killing boll weevils, a frame comprising a main central bow, wheels carried thereby, a plurality of auxiliary bows spaced from said main central bow and secured to the latter, a pair of open receptacles supported by said bows at the bottom ends thereof, said receptacles being spaced apart to provide a passage for the stems of the plant and the front ends of the receptacles flaring outwardly to provide guide means for the stems of the plants, a series of inwardly extending inclined spring arms secured to said bows, said arms being in staggered relation to each other, and the rear ends of said arms being fluted, and an external covering over the top and sides of the frame.

WILLIAM DANIEL ROBERTSHAW.

Witnesses:
HUGH C. WATSON,
L. A. BELL.